R. McCOY.
Harrow Attachment for Plows.
No. 209,348.       Patented Oct. 29. 1878.
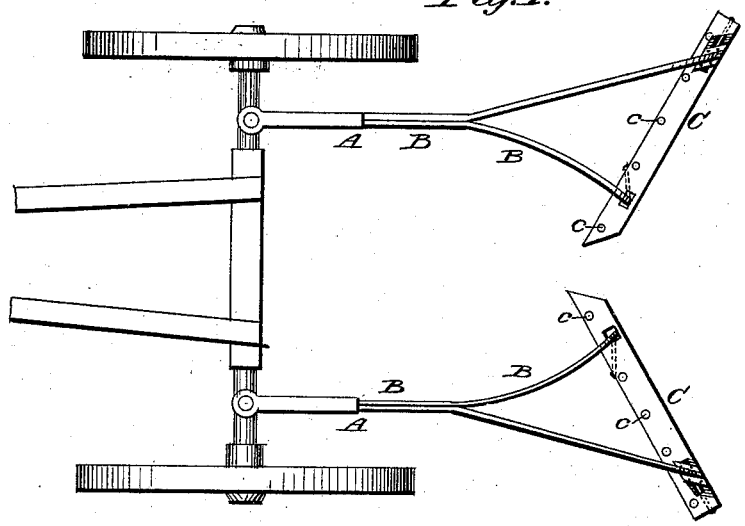
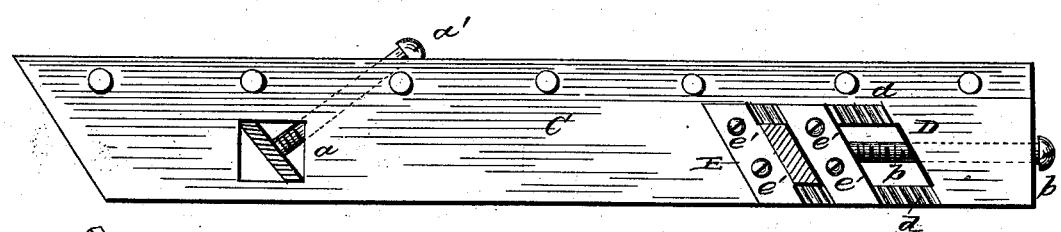
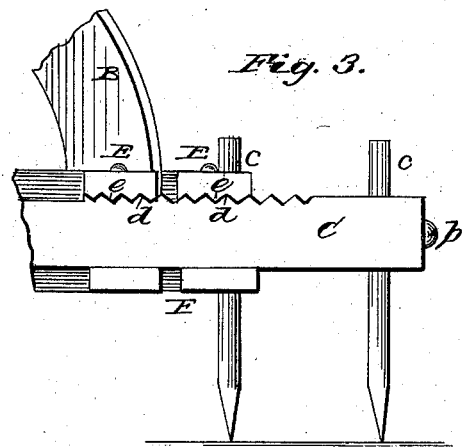
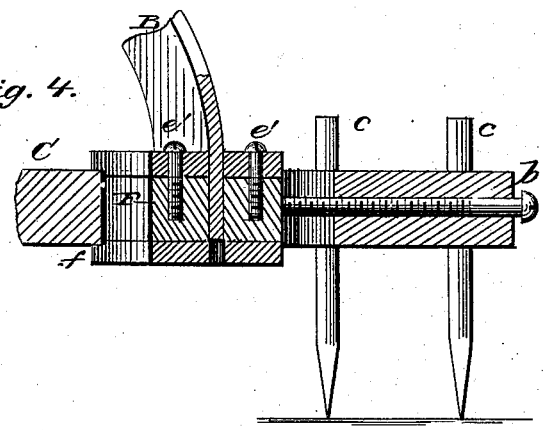
Witnesses
Reg. G. Dietrich
George Binkenburg
Inventor.
Robert McCoy
by DeWitt C. Allen
attorney.

UNITED STATES PATENT OFFICE.

ROBERT McCOY, OF McCOY'S STATION, INDIANA.

IMPROVEMENT IN HARROW ATTACHMENTS FOR PLOWS.

Specification forming part of Letters Patent No. 209,348, dated October 29, 1878; application filed September 24, 1878.

*To all whom it may concern:*

Be it known that I, ROBERT McCOY, of McCoy's Station, in the county of Decatur and State of Indiana, have invented certain new and useful Improvements in Harrow Attachments for Plows or Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a plan view of my improved attachment for harrows. Fig. 2 is a detached plan view of one of the harrow attachments. Figs. 3 and 4 are detailed views.

This invention relates to improvements in the class of harrow attachments for plows and cultivators; and the invention consists in the construction and arrangement of parts, as will be hereinafter fully described.

To enable others skilled in the art to make and use my invention, I will proceed to describe the exact manner in which it is carried out.

In the drawings, A represents the beams of a wheel-plow or straddle-row cultivator, which are provided with the usual shovel or plow standards B, and to which my improved harrow attachment is secured. The harrow in the present instance is composed of single beams C, having their front ends shaped diagonally, and the teeth $c$ arranged on a straight line in the beams, so that when the teeth come in contact with any substance on the ground they will readily clean themselves. The harrow-beams C are provided, near their rear ends, with vertical elongated slots D, passing entirely through the same, and are provided upon their upper surfaces on each side of said slots with diagonal corrugations or teeth $d$, within which the corrugations or teeth $e$ of the adjustable diagonal clamps E mesh, said clamps being secured by set-screws $e'$ to diagonal blocks F, arranged in the slots D of the beams, and having shoulders $f$, resting or bearing against the under side of said beams. Between said diagonal clamps the long arms of the shovel or plow standards are secured, while the short arms of the shovel or plow standards are secured in the vertical slots $a$ through the harrow-beams, near their front ends, by the set-screws $a'$, passing diagonally through the beams and plow or shovel standards, all as clearly shown in Fig. 2. The clamps are also secured by the bolts or screws $b$, passing lengthwise through the harrow-beams and engaging with the blocks of the outside clamp, as represented in Fig. 4.

By means of the adjustable clamping-blocks and elongated slots in the beams, the harrow-beams are adapted to be secured to the different-shaped beams or standards of any kind of double or other plows or cultivators.

I claim as my invention—

1. In a harrow attachment for plows or cultivators, the harrow beam or beams C, provided with the elongated slots D and diagonal corrugations or teeth $d$, in combination with the adjustable and diagonally-arranged clamps E, having similar corrugations or teeth $e$, and the blocks F $f$, substantially as herein shown and described.

2. In a harrow attachment for plows or cultivators, the harrow beam or beams C, having elongated slots D, corrugations or teeth $d$, the slots $a$, and set-screws $a'$, in combination with diagonal adjustable corrugated clamps E, diagonal blocks F $f$, and bolts or set-screws $b$, substantially as herein shown and described.

In testimony that I claim the foregoing as my own I affix my signature in presence of two witnesses.

ROBERT McCOY.

Witnesses:
 A. F. McCOY,
 CORT DONNELL.